(12) United States Patent
Olarig et al.

(10) Patent No.: US 7,296,093 B1
(45) Date of Patent: *Nov. 13, 2007

(54) NETWORK PROCESSOR INTERFACE SYSTEM

(75) Inventors: Sompong Paul Olarig, Pleasanton, CA (US); Mark Lyndon Oelke, Spring, TX (US); John E. Jenne, Houston, TX (US); Gary Kotzur, Spring, TX (US)

(73) Assignee: CipherMax, Inc., Houston, TX (US)

( * ) Notice: Subject to any disclaimer, the term of this patent is extended or adjusted under 35 U.S.C. 154(b) by 813 days.

This patent is subject to a terminal disclaimer.

(21) Appl. No.: 10/349,585

(22) Filed: Jan. 23, 2003

Related U.S. Application Data

(63) Continuation-in-part of application No. 10/039,190, filed on Dec. 31, 2001, now Pat. No. 7,145,914.

(51) Int. Cl.
*G06F 15/16* (2006.01)
(52) U.S. Cl. .................................. 709/250; 370/413
(58) Field of Classification Search ............... 709/202, 709/250, 227–229; 370/412–415, 419
See application file for complete search history.

(56) References Cited

U.S. PATENT DOCUMENTS

| | | | |
|---|---|---|---|
| 4,442,504 A | 4/1984 | Dummermuth et al. | 364/900 |
| 4,598,404 A | 7/1986 | Perry et al. | 371/49 |
| 4,692,073 A | 9/1987 | Martindell | 408/239 |
| 4,755,930 A | 7/1988 | Wilson, Jr. et al. | 364/200 |
| 4,903,259 A | 2/1990 | Hayano | 370/58.3 |
| 5,140,682 A | 8/1992 | Okura et al. | 395/425 |
| 5,247,649 A | 9/1993 | Bandoh | 395/425 |
| 5,289,460 A | 2/1994 | Drake et al. | 370/17 |
| 5,377,180 A | 12/1994 | Laurent | 370/16 |
| 5,394,556 A | 2/1995 | Oprescu | 395/800 |
| 5,515,376 A | 5/1996 | Murthy et al. | 370/85.13 |
| 5,530,832 A | 6/1996 | So et al. | 395/449 |
| 5,586,847 A | 12/1996 | Mattern, Jr. et al. | 408/239 A |
| 5,602,841 A | 2/1997 | Lebizay et al. | 370/413 |
| 5,606,669 A | 2/1997 | Bertin et al. | 395/200.2 |
| 5,611,049 A | 3/1997 | Pitts | 395/200.09 |
| 5,699,548 A | 12/1997 | Choudhury et al. | 395/469 |

(Continued)

OTHER PUBLICATIONS

U.S. Appl. No. 10/117,040 entitled "System and Method for Expansion of Computer Network Switching System Without Disruption Thereof," filed Apr. 5, 2002 by Mark Oelke et al.

(Continued)

*Primary Examiner*—Nathan Flynn
*Assistant Examiner*—Mohammad Siddiqi
(74) *Attorney, Agent, or Firm*—Baker Botts L.L.P.

(57) ABSTRACT

A heterogeneous and scalable bridge capable of translating a plurality of network protocols is adapted for coupling to a network switch fabric. The bridge uses at least one egress buffer interface and can perform port aggregation and bandwidth matching for various different port standards. The bridge is adapted for both networking and storage area networking protocols. A control unit is implemented with the bridge is able to identify control and flow information from different protocols and adapt them to the respective interface to which they are to be transmitted. Accounting logic is provided to one or more of the elements of the apparatus to aid in the tracking, storing, and reporting of network traffic.

53 Claims, 10 Drawing Sheets

U.S. PATENT DOCUMENTS

| | | | | |
|---|---|---|---|---|
| 5,778,429 | A | 7/1998 | Sukegawa et al. | 711/129 |
| 5,805,785 | A | 9/1998 | Dias et al. | 395/182.02 |
| 5,835,756 | A | 11/1998 | Caccavale | 395/601 |
| 5,835,943 | A | 11/1998 | Yohe et al. | 711/118 |
| 5,844,887 | A | 12/1998 | Oren et al. | 370/218 |
| 5,845,280 | A | 12/1998 | Treadwell, III et al. | 707/8 |
| 5,845,324 | A | 12/1998 | White et al. | 711/128 |
| 5,852,717 | A | 12/1998 | Bhide et al. | 395/200.33 |
| 5,864,854 | A | 1/1999 | Boyle | 707/10 |
| 5,873,100 | A | 2/1999 | Adams et al. | 707/204 |
| 5,878,218 | A | 3/1999 | Maddalozzo, Jr. et al. | 395/200.43 |
| 5,881,229 | A | 3/1999 | Singh et al. | 395/200.33 |
| 5,889,775 | A | 3/1999 | Sawicz et al. | 370/360 |
| 5,918,244 | A | 6/1999 | Percival | 711/119 |
| 5,924,864 | A | 7/1999 | Loge et al. | 433/118 |
| 5,930,253 | A | 7/1999 | Brueckheimer et al. | 370/395 |
| 5,933,607 | A | 8/1999 | Tate et al. | 395/200.7 |
| 5,933,849 | A | 8/1999 | Srbljic et al. | 711/118 |
| 5,944,780 | A | 8/1999 | Chase et al. | 709/201 |
| 5,944,789 | A | 8/1999 | Tzelnic et al. | 709/214 |
| 5,978,841 | A | 11/1999 | Berger | 709/217 |
| 5,978,951 | A | 11/1999 | Lawler et al. | 714/758 |
| 5,987,223 | A | 11/1999 | Narukawa et al. | 395/109 |
| 5,991,810 | A | 11/1999 | Shapiro et al. | 709/229 |
| 6,041,058 | A | 3/2000 | Flanders et al. | 370/401 |
| 6,044,406 | A | 3/2000 | Barkey et al. | 709/235 |
| 6,081,883 | A | 6/2000 | Popelka et al. | 712/28 |
| 6,085,234 | A | 7/2000 | Pitts et al. | 709/217 |
| 6,098,096 | A | 8/2000 | Tsirigotis et al. | 709/213 |
| 6,105,062 | A | 8/2000 | Andrews et al. | 709/223 |
| 6,128,306 | A | 10/2000 | Simpson et al. | 370/412 |
| 6,138,209 | A | 10/2000 | Krolak et al. | 711/128 |
| 6,147,976 | A | 11/2000 | Shand et al. | 370/254 |
| 6,243,358 | B1 | 6/2001 | Monin | 370/229 |
| 6,252,514 | B1 | 6/2001 | Nolan et al. | 340/686.4 |
| 6,289,386 | B1 | 9/2001 | Vangemert | 709/232 |
| 6,307,852 | B1* | 10/2001 | Fisher et al. | 370/352 |
| 6,320,859 | B1* | 11/2001 | Momirov | 370/395.1 |
| 6,361,343 | B1 | 3/2002 | Daskalakis et al. | 439/327 |
| 6,400,730 | B1 | 6/2002 | Latif et al. | 370/466 |
| 6,424,657 | B1* | 7/2002 | Voit et al. | 370/412 |
| 6,438,705 | B1 | 8/2002 | Chao et al. | 714/4 |
| 6,457,048 | B2 | 9/2002 | Sondur et al. | 709/220 |
| 6,470,013 | B1 | 10/2002 | Barach et al. | 370/392 |
| 6,484,209 | B1 | 11/2002 | Momirov | 709/238 |
| 6,499,064 | B1 | 12/2002 | Carlson et al. | 709/316 |
| 6,532,501 | B1 | 3/2003 | McCracken | 710/52 |
| 6,584,101 | B2 | 6/2003 | Hagglund et al. | 370/389 |
| 6,594,701 | B1 | 7/2003 | Forin | 709/232 |
| 6,597,689 | B1 | 7/2003 | Chiu et al. | 370/354 |
| 6,597,699 | B1 | 7/2003 | Ayres | 370/400 |
| 6,601,186 | B1 | 7/2003 | Fox et al. | 714/4 |
| 6,615,271 | B1 | 9/2003 | Lauck et al. | 709/232 |
| 6,654,895 | B1 | 11/2003 | Henkhaus et al. | 713/320 |
| 6,657,962 | B1 | 12/2003 | Barri et al. | 370/235 |
| 6,662,219 | B1 | 12/2003 | Nishanov et al. | 709/220 |
| 6,674,756 | B1 | 1/2004 | Rao et al. | 370/395.21 |
| 6,687,247 | B1 | 2/2004 | Wilford et al. | 370/392 |
| 6,701,318 | B2 | 3/2004 | Stuart et al. | 370/403 |
| 6,704,318 | B1 | 3/2004 | Stuart et al. | 370/403 |
| 6,721,818 | B1 | 4/2004 | Nakamura | 710/9 |
| 6,731,644 | B1 | 5/2004 | Epps et al. | 370/412 |
| 6,731,832 | B2 | 5/2004 | Alvarez et al. | 385/16 |
| 6,735,174 | B1 | 5/2004 | Hefty et al. | 370/235 |
| 6,747,949 | B1 | 6/2004 | Futral | 370/231 |
| 6,754,206 | B1* | 6/2004 | Nattkemper et al. | 370/369 |
| 6,757,791 | B1 | 6/2004 | O'Grady et al. | 711/154 |
| 6,758,241 | B1 | 7/2004 | Pfund et al. | 137/596 |
| 6,762,995 | B1 | 7/2004 | Drummond-Murray et al. | 370/229 |
| 6,765,871 | B1 | 7/2004 | Knoebel et al. | 370/231 |
| 6,765,919 | B1 | 7/2004 | Banks et al. | 370/401 |
| 6,792,507 | B2 | 9/2004 | Chiou et al. | 711/119 |
| 6,822,957 | B1 | 11/2004 | Schuster et al. | 370/389 |
| 6,839,750 | B1 | 1/2005 | Bauer et al. | 709/223 |
| 6,845,431 | B2 | 1/2005 | Camble et al. | 711/152 |
| 6,847,647 | B1 | 1/2005 | Wrenn | 370/395.32 |
| 6,850,531 | B1 | 2/2005 | Rao et al. | 370/401 |
| 6,865,151 | B1* | 3/2005 | Saunders | 370/230 |
| 6,865,602 | B1 | 3/2005 | Nijemcevic et al. | 709/223 |
| 6,876,663 | B2 | 4/2005 | Johnson et al. | 370/416 |
| 6,876,668 | B1* | 4/2005 | Chawla et al. | 370/468 |
| 6,879,559 | B1 | 4/2005 | Blackmon et al. | 370/225 |
| 6,889,245 | B2 | 5/2005 | Taylor et al. | 709/203 |
| 6,938,084 | B2 | 8/2005 | Gamache et al. | 709/226 |
| 6,944,829 | B2 | 9/2005 | Dando | 715/798 |
| 6,954,463 | B1 | 10/2005 | Ma et al. | 370/401 |
| 6,973,229 | B1 | 12/2005 | Tzathas et al. | 385/16 |
| 6,980,515 | B1 | 12/2005 | Schunk et al. | 370/230.1 |
| 6,983,303 | B2 | 1/2006 | Pellegrino et al. | 709/203 |
| 6,985,490 | B2 | 1/2006 | Czeiger et al. | 370/401 |
| 6,988,149 | B2 | 1/2006 | Odenwald | 709/250 |
| 7,006,438 | B2 | 2/2006 | West et al. | 370/231 |
| 7,010,715 | B2 | 3/2006 | Barbas et al. | 714/4 |
| 7,013,084 | B2 | 3/2006 | Battou et al. | 398/45 |
| 7,035,212 | B1* | 4/2006 | Mittal et al. | 370/230 |
| 7,079,485 | B1* | 7/2006 | Lau et al. | 370/229 |
| 7,145,914 | B2* | 12/2006 | Olarig et al. | 370/413 |
| 7,190,695 | B2 | 3/2007 | Schaub et al. | 370/392 |
| 2001/0023443 | A1 | 9/2001 | Fichou et al. | 709/227 |
| 2001/0037435 | A1 | 11/2001 | Van Doren | 711/153 |
| 2001/0043564 | A1 | 11/2001 | Bloch et al. | 370/230 |
| 2002/0004842 | A1 | 1/2002 | Ghose et al. | 709/235 |
| 2002/0010790 | A1 | 1/2002 | Ellis et al. | 709/238 |
| 2002/0012344 | A1 | 1/2002 | Johnson et al. | 370/389 |
| 2002/0024953 | A1 | 2/2002 | Davis et al. | 370/395.1 |
| 2002/0034178 | A1 | 3/2002 | Schmidt et al. | 370/386 |
| 2002/0071439 | A1 | 6/2002 | Reeves et al. | 370/400 |
| 2002/0078299 | A1 | 6/2002 | Chiou et al. | 711/119 |
| 2002/0103921 | A1 | 8/2002 | Nair et al. | 709/232 |
| 2002/0118682 | A1 | 8/2002 | Choe | 370/395.3 |
| 2002/0165962 | A1 | 11/2002 | Alvarez et al. | 709/226 |
| 2002/0176131 | A1 | 11/2002 | Walters et al. | 359/118 |
| 2002/0186703 | A1 | 12/2002 | West et al. | 370/413 |
| 2002/0188786 | A1 | 12/2002 | Barrow et al. | 710/300 |
| 2003/0002506 | A1 | 1/2003 | Moriwaki et al. | 370/392 |
| 2003/0012204 | A1 | 1/2003 | Czeiger et al. | 370/401 |
| 2003/0014540 | A1 | 1/2003 | Sultan et al. | 709/240 |
| 2003/0026267 | A1 | 2/2003 | Oberman et al. | 370/397 |
| 2003/0033346 | A1 | 2/2003 | Carlson et al. | 709/104 |
| 2003/0037022 | A1 | 2/2003 | Adya et al. | 707/1 |
| 2003/0037177 | A1 | 2/2003 | Sutton et al. | 709/316 |
| 2003/0048792 | A1 | 3/2003 | Xu et al. | 370/400 |
| 2003/0063348 | A1 | 4/2003 | Posey, Jr. | 359/139 |
| 2003/0074449 | A1 | 4/2003 | Smith et al. | 709/226 |
| 2003/0084219 | A1 | 5/2003 | Yao et al. | 710/300 |
| 2003/0091267 | A1 | 5/2003 | Alvarez et al. | 385/16 |
| 2003/0093541 | A1 | 5/2003 | Lolayekar et al. | 709/230 |
| 2003/0093567 | A1 | 5/2003 | Lolayekar et al. | 709/246 |
| 2003/0097439 | A1 | 5/2003 | Strayer et al. | 709/224 |
| 2003/0097445 | A1 | 5/2003 | Todd et al. | 709/226 |
| 2003/0126223 | A1 | 7/2003 | Jenne et al. | 709/212 |
| 2003/0126280 | A1 | 7/2003 | Hawkins et al. | 709/234 |
| 2003/0126297 | A1 | 7/2003 | Olarig et al. | 709/250 |
| 2003/0128703 | A1 | 7/2003 | Zhao et al. | 370/392 |
| 2003/0015430 | A1 | 8/2003 | McEachem et al. | 709/237 |
| 2003/0152182 | A1 | 8/2003 | Pai et al. | 375/372 |
| 2003/0163555 | A1 | 8/2003 | Battou et al. | 709/223 |
| 2003/0195956 | A1 | 10/2003 | Bramhall et al. | 709/223 |
| 2003/0198231 | A1 | 10/2003 | Kalkunte et al. | 370/395.31 |
| 2003/0202520 | A1 | 10/2003 | Witkowski et al. | 370/400 |
| 2005/0018619 | A1 | 1/2005 | Banks et al. | 370/254 |
| 2005/0018709 | A1 | 1/2005 | Barrow et al. | 370/465 |

| | | | |
|---|---|---|---|
| 2005/0044354 A1 | 2/2005 | Hagerman | 713/160 |
| 2005/0243734 A1 | 11/2005 | Nemirovsky et al. | 370/252 |

OTHER PUBLICATIONS

U.S. Appl. No. 10/117,266 entitled "System and Method for Guarnateed Link Layer Flow Control," filed Apr. 5, 2002 by Hani Ajus et al.

U.S. Appl. No. 10/117,638 entitled "Fibre Channel Implementation Using Network Processors," filed Apr. 5, 2002 by Yao Hawkins et al.

U.S. Appl. No. 10/117,290 entitled "Method and System for Reduced Distributed Event Handling in a Network Environment," filed Apr. 5, 2002 by Huang Ruotao et al.

U.S. Appl. No. 10/117,418 entitled "System and Method for Linking a Plurality of Network Switches," filed Apr. 5, 2002 by Ram Iyer et al.

PCT International Search Report PCT/US01/47769, 3 pages, Mailing Date Apr. 23, 2002.

N. Lynch et al.; "The Data Link Layer: Two Impossibility Results."; Proceedings of the Seventh Annual ACM Symposium on Principles of Distributed Computing; ACM Press; pp. 149-170, Jan. 1988.

J. Kim et al.; "Bandwidth Allocation in Wireless Networks with Guaranteed Packet-Loss Performance"; IEEE/ACM TRansactions on Networking, vol. 8, No. 3; pp. 337-349, Jun. 2000.

A. Banerjea et al.; "Fault Recovery For Guaranteed Performance Communications Connections"; IEEE/ACM Transactions on Networking, vol. 7, No. 5; pp. 653-668, Oct. 1999.

P. Newman et al.; "IP Switching-ATM Under IP"; IEEE/ACM Transactions on Networking, vol. 6, No. 2; pp. 117-129, Apr. 1998.

"Microsoft Computer Dictionary: Fifth Edition"; Microsoft Press; p. 3, 2002.

Mary Baker et al., "The Recovery Box: Using Fast Recovery to Provide High Availability in the UNIX Environment," *Summer '92 USENIX* (pp. 31-43), Jun. 8, 1992.

George Candea et al., "Microreboot—A Technique for Cheap Recovery," *Computer Systems Lab, Stanford* University, http://swig.stanford.edu/~candea/papers/microreboot/html/index.html (31pages), Dec. 1, 2004.

\* cited by examiner

| | | Byte 8 | Byte 7 | Byte 6 | Byte 5 | Byte 4 | Byte 3 | Byte 2 | Byte 1 | |
|---|---|---|---|---|---|---|---|---|---|---|
| CELL 2 | | | | | | | | ECC 10 | ECC 9 | Cycle 24 |
| | | ECC 8 | ECC 7 | ECC 6 | ECC 5 | ECC 4 | ECC 3 | ECC 2 | ECC 1 | Cycle 23 |
| | Burst 3 | A80 | A79 | A78 | A77 | A76 | A75 | A74 | A73 | Cycle 22 |
| | | A72 | A71 | A70 | A69 | A68 | A67 | A66 | A65 | Cycle 21 |
| | | A64 | A63 | A62 | A61 | A60 | A59 | A58 | A57 | Cycle 20 |
| | Burst 2 | A56 | A55 | A54 | A53 | A52 | A51 | A50 | A49 | Cycle 19 |
| | | A48 | A47 | A46 | A45 | A44 | A43 | A42 | A41 | Cycle 18 |
| | | A40 | A39 | A38 | A37 | A36 | A35 | A34 | A33 | Cycle 17 |
| | | A32 | A31 | A30 | A29 | A28 | A27 | A26 | A25 | Cycle 16 |
| | Burst 1 | A24 | A23 | A22 | A21 | A20 | A19 | A18 | A17 | Cycle 15 |
| | | A16 | A15 | A14 | A13 | A12 | A11 | A10 | A9 | Cycle 14 |
| | | A8 | A7 | A6 | A5 | A4 | A3 | A2 | A1 | Cycle 13 |
| CELL 1 | | | | | | | | ECC 10 | ECC 9 | Cycle 12 |
| | | ECC 8 | ECC 7 | ECC 6 | ECC 5 | ECC 4 | ECC 3 | ECC 2 | ECC 1 | Cycle 11 |
| | Burst 3 | A80 | A79 | A78 | A77 | A76 | A75 | A74 | A73 | Cycle 10 |
| | | A72 | A71 | A70 | A69 | A68 | A67 | A66 | A65 | Cycle 9 |
| | | A64 | A63 | A62 | A61 | A60 | A59 | A58 | A57 | Cycle 8 |
| | Burst 2 | A56 | A55 | A54 | A53 | A52 | A51 | A50 | A49 | Cycle 7 |
| | | A48 | A47 | A46 | A45 | A44 | A43 | A42 | A41 | Cycle 6 |
| | | A40 | A39 | A38 | A37 | A36 | A35 | A34 | A33 | Cycle 5 |
| | | A32 | A31 | A30 | A29 | A28 | A27 | A26 | A25 | Cycle 4 |
| | Burst 1 | A24 | A23 | A22 | A21 | A20 | A19 | A18 | A17 | Cycle 3 |
| | | A16 | A15 | A14 | A13 | A12 | A11 | A10 | A9 | Cycle 2 |
| | | A8 | A7 | A6 | A5 | A4 | A3 | A2 | A1 | Cycle 1 |

■ Frame Data  ☐ ECC  ☐ Unused

FIGURE 10

NETWORK PROCESSOR INTERFACE SYSTEM

CROSS-REFERENCE TO RELATED APPLICATIONS

This application is a Continuation-in-Part patent application U.S. Pat. No. 7,145,914 entitled "Network Processor Interface System" by Sompong Paul Olarig, Mark Lyndon Oelke and John E. Jenne, which was filed on Dec. 31, 2001 and which is incorporated herein by reference in its entirety for all purposes. This Continuation-in-Part patent application is also related to commonly owned U.S. patent application Ser. No. 10/015,047, entitled "System, Apparatus and Method for Address Forwarding for a Computer Network" by Hawkins Yao, Cheh-Suei Yang, Richard Gunlock, Michael L. Witkowski, and Sompong Paul Olarig, which was filed on Oct. 26, 2001 and which is incorporated herein by reference in its entirety for all purposes; to U.S. patent application Ser. No. 10/039,189 entitled "XON/XOFF Flow Control for Computer Network" by Hawkins Yao, Mark Lyndon Oelke and John E. Jenne, which was filed on Dec. 31, 2001, and which is incorporated herein by reference in its entirety for all purposes; and U.S. Pat. No. 7,085,846 "Buffer to Buffer Credit Flow Control for Computer Network" by John E. Jenne, Mark Lyndon Oelke and Sompong Paul Olarig, which was filed on Dec. 31, 2001, and which is incorporated herein by reference in its entirety for all purposes.

FIELD OF THE INVENTION

The present invention is related to computer networks. More specifically, the present invention is related to a system and method for bridging a plurality of network processor interfaces with a switch fabric interface.

BACKGROUND OF THE INVENTION TECHNOLOGY

Current Storage Area Networks (SANs) are designed to carry block storage traffic over predominantly Fibre Channel standard medium and protocols. There exist several proposals for moving block storage traffic over SANs built on other networking technology such as Gigabit Ethernet, asynchronous transfer mode (ATM)/SONET, InfiniBand or other networking medium and protocols. A bridge is sometimes used to couple a network processor with a switch fabric interface. For example, a switch fabric interface is standardized by the Common Switch Interface Consortium (CSIX) and known as a CSIX switch fabric. There are many other proprietary interfaces. For example, UTOPIA 3, POS-PHY 3, SPI-3, and SPI-4 are another standards. The network processors, however, often have a different interface. These bridges or translation devices, therefore, make the necessary translations between these two protocols/mediums in order to serve the clients (host computers/servers and storage target devices). Existing bridges usually allow the connection of a single network processor interface to one switch fabric interface. Such bridges may provide some functionality with respect to ingress/egress handling, congestion management, protocol translation, and Quality of Service (QoS)-based thresholding.

Many silicon vendors offer a total solution of network processor and switch fabric that work together. However, depending on the goals of the system design, it may be desirable to mix a network processor and a switch fabric from different vendors. Often this requires glue logic between the two devices because the interfaces are not compatible.

Another issue is that some switch fabrics only have an OC-192 port granularity that makes it difficult to connect OC-48 network processors, wherein, OC-192, OC-48 refer to the bandwidth of interfaces in the telecommunications world. Normally, these interfaces are for handling Synchronous Optical NETwork/Synchronous Digital Hierarchy (SONET/SDH). There are various interfaces that meet the SONET/SDH bandwidth requirements, as mentioned above, such as POS-PHY, Utopia, CSIX, SPI, etc. Therefore, more intelligent bridges are needed to mux/demux the OC-48 to OC-192 traffic.

It is difficult to build heterogeneous SANs that are scalable using these bridges/translation devices because the bridges/translation devices usually become the bottleneck as the number of clients and the number of storage devices increase. In addition, a mixed protocol environment requires the installation of complex hardware or logic on these bridges/translation devices.

SUMMARY OF THE INVENTION

The present invention overcomes the above-identified problems as well as other shortcomings and deficiencies of existing technologies by providing an apparatus, system and method for building heterogeneous and scalable bridges/translation devices in combination with a network switch fabric system.

The present invention is directed to a network system comprising a plurality of network processor interfaces for transmitting and receiving data cell sequences, a switch fabric interface; an ingress path providing a plurality of ingress queues between the plurality of network processor interfaces and the switch fabric interface combining the transmitted data calls of the network processors to a single data cell sequence, an egress path providing a plurality of egress queues and a memory controller between the plurality of the switch fabric interface and network processor interfaces for distributing data cell sequences from a received data cell sequence to the respective network processor interfaces. The egress path may comprise a first egress path handling control signals and a second egress path handling data signals. Each network processor interface may comprise a receiving interface and a transmitting interface. The ingress queues may each have an input and an output, each ingress queue input being coupled with a respective transmitting network processor interface, and the ingress path may further comprise a multiplexer coupled with the outputs of the plurality of ingress queues and the switch fabric interface. The network system may further comprise an ingress output queue coupled between the multiplexer and the switch fabric interface. The egress path may comprise a demultiplexer coupled with the switch fabric interface and the plurality of egress queues. The memory controller may comprise a memory interface and an egress path that routes the received cells through a memory coupled with the memory controller or directly to the network processor interfaces if no memory is coupled with the memory controller. The network system may further comprise a first set of egress queues coupled between the demultiplexer and a memory multiplexer coupled with a memory controller input, a memory demultiplexer coupled with a memory controller output, a second set of egress queues coupled between the memory demultiplexer and the network processor interfaces. The egress path may comprise a first egress path handling control signals and a second egress path handling data signals, wherein the first egress path may comprise a third set of egress queues coupled between the demultiplexer and the network processors and the second egress path may comprise the first and second egress queues, and wherein a plurality of output multiplexers may be coupled between the network processors and the first and second egress paths. The first and second set of egress queues may comprise two queues associated with each network processor interface. The memory interface may be configured to couple with an error correcting memory. The memory interface may be configured to couple with a dynamic memory, such as DDR SRAM. The memory interface may be configured to couple with a static memory, such as QDR ECC SRAM. The error correcting memory may be an in-band memory. Each queue may comprise an associated watermark register. The network system may further comprise a control unit for controlling the ingress and egress queues. The network system may further comprise a host-subsystem interface coupled with the control unit. The network processor interface may be provided on a line card having five network processor ports, although other numbers of processor ports may be used. The switch fabric interface may have a higher bandwidth than one of the plurality of network processor interfaces and the number of network processors interfaces may be adapted to approximately match the bandwidth of the bandwidth of the switch fabric interface.

The present invention is also directed to a method of controlling the ingress and egress data paths of a network processor interface system, the method comprising the steps of: providing a plurality of network processor interfaces for transmitting and receiving data cell sequences, providing a switch fabric interface; providing an ingress path having a plurality of ingress queues between the plurality of network processor interfaces and the switch fabric interface combining the transmitted data calls of the network processors to a single data cell sequence; and providing an egress path having a plurality of egress queues and a memory controller between the plurality of the switch fabric interface and network processor interfaces for distributing data cell sequences from a received data cell sequence to the respective network processor interfaces. The method may further comprise the steps of buffering transmitted data cells in the ingress queues, combining the content of the ingress queues and buffering the combined data cells in an ingress output queue. The method may further comprise the step of splitting the egress path in a first path handling control data cells and a second path handling data cells. The method may further comprise the step of: if a memory is coupled to the memory interface, storing received data cells in the memory, otherwise moving the received data cells directly to the respective network processor interface. The method may further comprise the steps of providing at least two egress queues for each network processor interface, and selecting which queue is coupled with the associated network processor interface. The method may further comprise the steps of generating a control data cell by the memory controller, and routing the generated control cell through the first egress path. The method may further comprise the steps of monitoring the filling level of the queues and generating control signals according to the filling level. The method may further comprise the step of discarding data cells according to their status if the filling level is reached within a queue. The method may further comprise the step of distributing data cells according to a priority scheme included in the data cells. The method may further comprise the step of distributing data cells according to a Quality of Service scheme included in the data cells. Storage area network and networking protocols may be processed. The switch fabric interface may have a higher bandwidth than one of the plurality of network processor interfaces, and the method may further comprise the step of providing a number of network processor interfaces adapted for combining the bandwidth of the network processors to approximately match the bandwidth of the switch fabric interface. The bandwidth of the switch fabric interface may be lower than the combined bandwidth of the network processor interfaces.

The bridge of the present invention can also be provided with accounting features (such as a separate processor and/or memory). The accounting feature can gather, process, and or disseminate network traffic information. Various embodiments of the present invention have the accounting logic (co-processor) on the bus, on one or more MAC's, and/or connected to one or more of the network processors, or some combination there between.

Other and further features and advantages will be apparent from the following description of exemplary embodiments of the invention, given for the purpose of disclosure and taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings, wherein:

FIGS. 7 to 10 illustrate different embodiments of egress memories and respective writing sequences.

Figure 1:
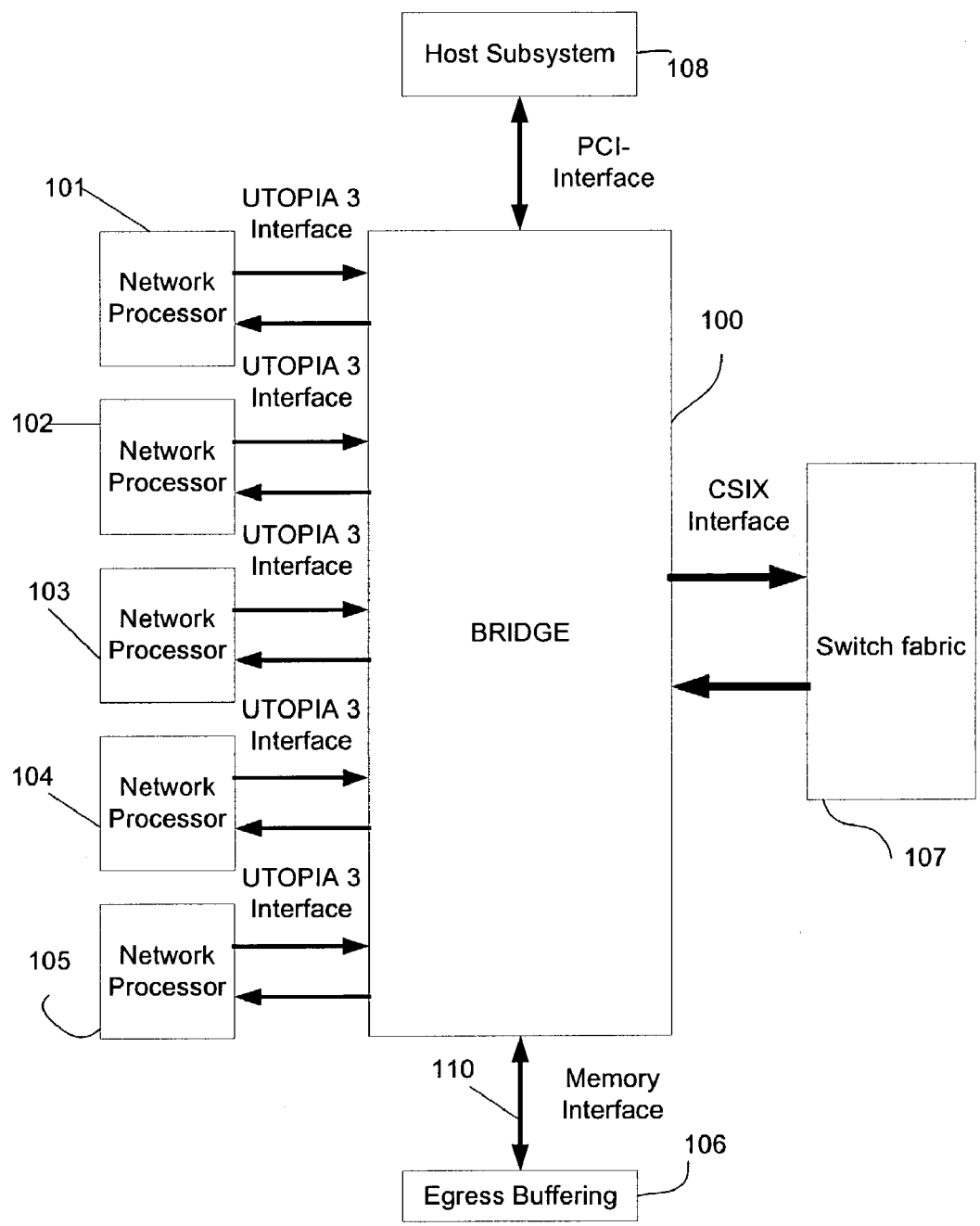
FIG. 1 is a schematic representation of a system including a bridge according to the present invention.

While the present invention is susceptible to various modifications and alternative forms, specific exemplary embodiments thereof have been shown by way of example in the drawings and are herein described in detail. It should be understood, however, that the description herein of specific exemplary embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

The present invention relates to a system, apparatus and method for bridging a plurality of network processors with at least one switch fabric interface. In addition, a host subsystem interface can be implemented. The bridge uses at least one egress buffer interface and can perform port aggregation and bandwidth matching. The present invention is able to handle both networking and storage area networking protocols through its unique structure. The control unit that is implemented is able to identify both control and flow information from different protocols and to adapt them to the respective interface to which they are transmitted.

FIG. 1 schematically illustrates the different interfaces of a bridge according to an exemplary embodiment of the present invention. The bridge is generally designated by numeral 100. It comprises a plurality of network processor interfaces, for example, according to the UTOPIA 3 specification developed by the ATM. In the present embodiment, five network processors 101, 102, 103, 104, and 105 may be coupled through these interfaces. These interfaces for the network processors 101, 102, 103, 104, and 105 may have, for example but not be limited to, a bit width of 32 and an operating speed of 100 MHz. A network processor interface according to the Utopia 3 standard is a point-to-point interface and is uni-directional. Thus, there is a 32-bit Tx and a 32-bit Rx interface between each network processor (101, 102, 103, 104, and 105) and the bridge 100. Furthermore, a parity bit can be provided, covering, for example but not limited to, 32 bits. In a Utopia 3 interface, this parity bit is defined by the Utopia 3 specification. Thus, each network processor 101, 102, 103, 104, and 105 generates one parity bit for the ingress path and one parity bit will be received and verified on the 32 Bit network processor ingress interface.

A Common Switch Interface Consortium (CSIX) switch fabric interface couples the bridge with a switch fabric 107. Of course, any other type of switch fabric interface can be implemented and is contemplated herein. Thus, the present invention is not limited to only CSIX interfaces. This CSIX interface comprises, for example but is not limited to, a bus width of 64 bits and operates at a speed of 200 MHz. It can also be provided with a parity function. To this end, one parity bit is provided for each 32 bits, e.g., two parity bits are generated for the CSIX ingress interface and two parity bits are generated for the CSIX egress interface. Furthermore, a host subsystem 108 may be coupled with the bridge through a bus 109. Here a single parity bit covering 16 bits may be used. Thus, one parity bit will be used for transmitting and one for receiving by the subsystem interface. As no high speed data transmission is necessary for this interface, this bus 109 can be implemented, e.g., as a standard PCI bus having a bit width of, for example, 32 bits and an operating speed of 33 MHz or a proprietary bus used for connecting the bridge to the host subsystem and the like. If a proprietary bus is used, this bus can have, for example, a multiplexed address/data bus such as a split transaction bus. Any other suitable bus can be used to interface the bridge with a host subsystem and is contemplated herein.

Finally, a special interface for an egress buffer memory 106 is provided. This interface may have, for example but not limited to, a bus width of 128 bits operating at a speed of 100 MHz. The error correction system for this interface will be explained in more detail below. A preferred configuration includes external memory 106 coupled through the memory bus 110. This memory 106 may be used to handle the egress buffering operations. In one exemplary embodiment, the 128 bit wide interface may be bidirectional or in another exemplary embodiment it may comprise a 64 bit read and a 64 bit write memory interface with 8 bits of parity for each direction. Such a wide interface is desired so as to match the write bandwidth requirement of the one switch fabric interface and the read bandwidth requirement of the five network processor interfaces. The size of the external memory 106 depends on the amount of traffic as will be explained in more detail below. Furthermore, different types of memory having different data widths may be supported to accommodate all kinds of memories, e.g., high speed memory devices, such as quad data rate (QDR) SRAM memories and the like.

Figure 2:
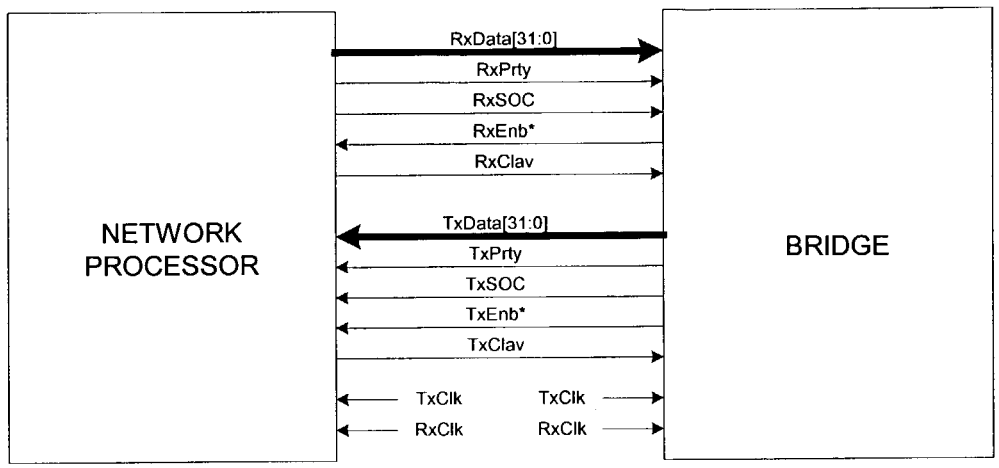
FIG. 2 is a more detailed representation of the interface between the bridge and a network processor.

FIG. 2 depicts one of the network processor interfaces in greater detail. A network processor 101 is coupled through this interface with a split bus for receiving and transmitting data. The receiving bus comprises 32 bits of data, RxData, and four different control signals: 1) RxPrty for the receive data bus odd parity, 2) RxSOC for the receive start of a cell, 3) RxEnb for the receive enabling, and 4) RxClav for the cell available control. The transmitting bus comprises 32 bits of data, TxData, and 4 different control signals: 1) TxPrty for the transmit data bus odd parity, 2) TxSOC for the transmit start of a cell, 3) TxEnb for the transmit enabling, and 4) TxClav for the cell buffer available control. Furthermore, separate clock signal lines TxClk and RxClk for the transmitting and the receiving bus are provided. Unlike the switch fabric bus, this bus does not send idle cells and has an out of band flow control. The bridge 100, according to the present invention, is able to interpret flow and control information for all kinds of storage area network protocols and network protocols. The bridge 100 distributes data cells and control cells to their destined ports, and handles additional functions such as Quality of Service or discarding functions. The information handled by the bridge 100 is usually included in specific bits of control bytes within the data and/or control cells. Depending on the aggregate bandwidth of the ingress/egress ports the system handles the data flow of the control and data cells to optimize speed and functionality of the entire system. For example, many ports may have a limited bandwidth whereas the switch fabric bandwidth is much larger in comparison. Thus, the system according to the present invention increases the port count I/O connectivity and reduces the cost per port of networks such as a SAN by combining a plurality of network processor interfaces with one high speed switch fabric interface.

The bridge 100 comprises all necessary circuits to couple the respective network processors 101, 102, 103, 104, and 105 with the switch fabric 107 and to adapt the respective data transfer protocols, meet all requirements to communicate with the switch fabric 107 including link level flow control and idle cell generation.

Figure 3:
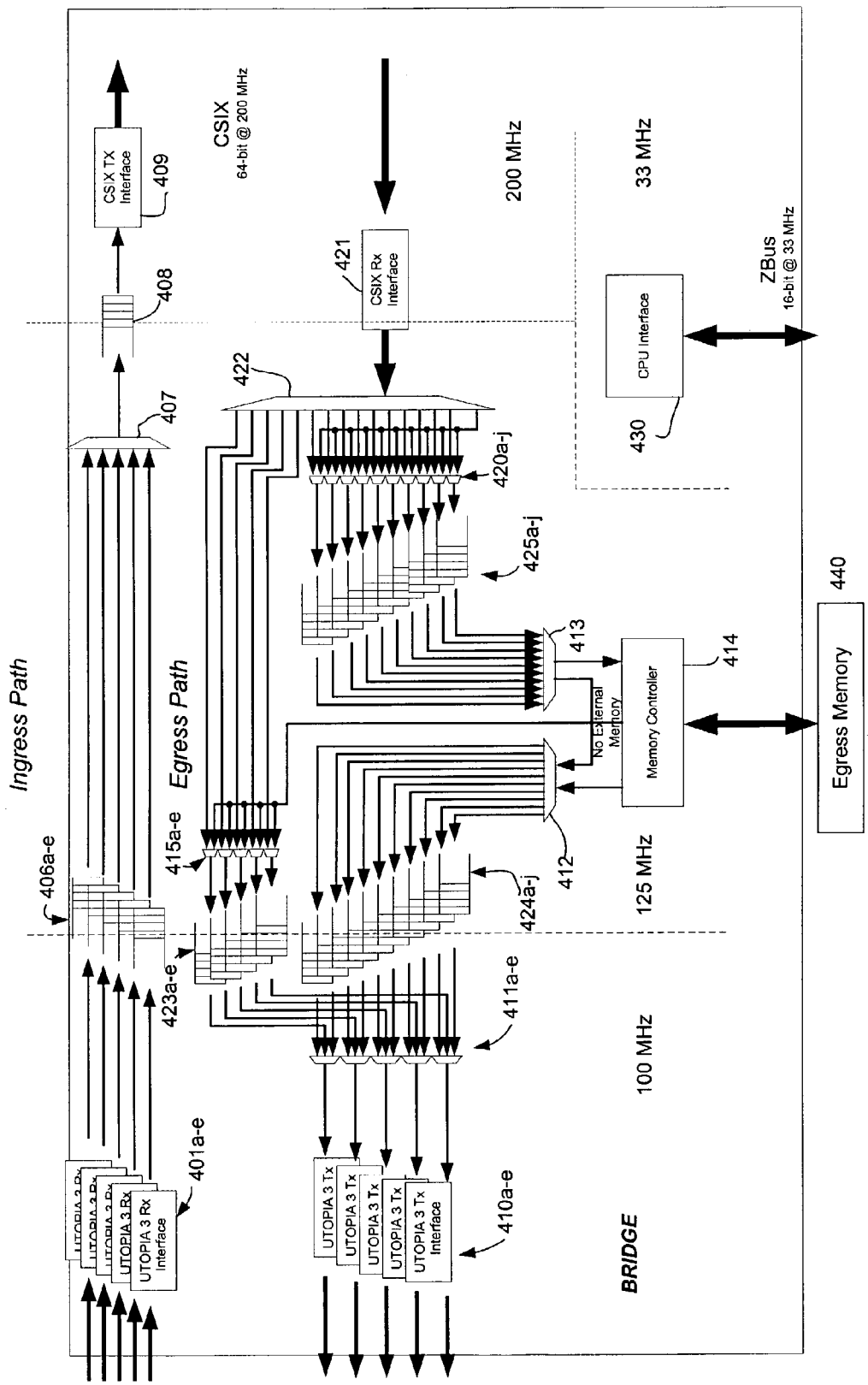
FIG. 3 a more detailed schematic block diagram of a bridge according to the present invention.

FIG. 3 illustrates a more detailed block diagram of the bridge 100. The ingress path, providing communication from the network processors 101, 102, 103, 104, and 105 to the switch fabric 107 provides, for example but not limited to, five unidirectional interfaces 401*a-e*. Thus, a bridge arrangement can serve five network processors. Thus, it is easy to extend the system on a base-10 rather than a base-2 that is preferable to system users. For example, a line card can comprise 10 ports. Therefore, a plurality of line cards will support a plurality of 10 ports, which is highly preferred over multiples of 2 ports as in the prior art.

Numeral 406*a-e* indicates the inbound data queues for each path. These queues 406*a-e* are coupled through a multiplexer 407 with a single queue 408 that is coupled with CSIX Tx interface 409. An arbitrator (not shown) is used to control the multiplexer. The arbitrator arbitrates among the five inbound queues 406*a-e* in a round robin fashion. Each queue 406*a-e* and 408 can be implemented with a weighed priority scheme that will be described hereinbelow and that may be monitored by the bridge system. In another exemplary embodiment of the present invention, so-called watermark registers can be used to indicate the filling status of a queue. The ingress path also handles width and frequency matching between the interfaces as the data width of the CSIX Tx interface 109 is twice as wide and twice as fast as that of each network processor interface 401a-e. The depth of the queues 406a-e can be configured depending on the overall system performance. The queues 406a-e and 408 can have, for example, a depth of 10 cells for the ingress outbound queue to provide sufficient depth, thus minimizing unnecessary back pressure via Link-Level Flow Control caused by temporary over-subscription. While a depth of ten cells is illustrated above, the present invention is not limited to a ten-cell depth. An over-subscription situation can take place in the unlikely event that all network processors operate at full speed. In that case, the outbound speed of 64 bit width @ 200 MHz (equivalent to 32 bit width @ 400 MHz) will be overloaded by the five network processors (equivalent to 32 bit width @ 500 MHz). However, normally the network processor throughput is usually around 1000 MB/s for ten 1 Gbps fibre channels. As the 64-bit @ 200 MHz CSIX interface's throughput is actually 1280 MB/s, in particular after removing overhead, it is unlikely that any bandwidth problem will occur.

The bridge 100 is also adapting the different data cell sizes of the incoming and outgoing data cells, thereby matching the respective specifications. The CSIX interface, for example but not limited to, transmits and receives 80-byte fixed length data cells. However, the network processor, for example, according to the UTOPIA 3 specification, sends and receives 68-byte data cells. Thus, the bridge will generate and append a 6-byte CSIX header and a 6-byte CSIX trailer in the ingress direction. The network processor can allow the UTOPIA 3 cell size to be configured. Other configurations are therefore possible and can be implemented and are contemplated herein.

The egress path provides two different flow paths. CSIX Rx interface 421 couples the bridge with the switch fabric. A de-multiplexer 422 distributes the data cells to either the first path consisting of five direct egress paths or the second path consisting of 10 egress paths including a memory controller 414. The first path may be used exclusively for control cells. Control cells are used to implement network processor to network processor control messages, such as port level flow control. Control cells have the highest priority and are queued separately from the other so-called unicast or multicast cells. The CSIX cell header will not indicate control cells. The bridge will have to look at a field in the embedded UTOPIA 3 cell header. When a control cell is received on the interface 421 it is queued in a special control inbound queue 423a-e through multiplexers 415a-e. There are five control outbound queues 423a-e, one for each UTOPIA 3 interface 410a-e. Multiplexers 415a-e are provided between de-multiplexer 422 and the input of queues 423a-e. Furthermore, first inputs of five multiplexers 411a-e are coupled with the outputs of queues 423a-e. The outputs of multiplexers 411a-e are coupled with the transmitter interfaces 410a-e for the network processors 101, 102, 103, 104, and 105.

When no external memory is present, control cells are moved from the control inbound queue and broadcast to all five control outbound queues 423a-e. If external memory 440 is present, control messages can be generated by the memory controller 414 indicating egress buffer congestion. An arbitrator fairly selects through multiplexers 415a-e control cells from the control inbound queue and from the memory controller 414. The UTOPIA 3 interface 410a-e has arbiters controlling multiplexers 411a-e that give priority to control cells over unicast and multicast cells. Unicast messages are messages that are destined for a single target, whereas multicast messages are messages that are destined for multiple targets. The control unit distributes these messages by means of the multiplexers. To this end, multicast messages are copied into all destination queues. Thus, unicast cells are cells that arrive at de-multiplexer 422 and, based on the label contents in the cell header, are queued to a single queue 425a-j and, hence, a single network processor. Multicast cells are cells that arrive at de-multiplexer 422 and, based on the label contents in the cell header, are queued to one or more queues 425a-j and, hence, more than one network processor. Since control cells have the highest priority and arrive infrequently compared to normal data cells, the queuing requirements are minimal. A control outbound queue depth of 3 cells for queue 423a-e per UTOPIA 3 interface 410a-e may therefore be sufficient. However, depending on the design, each queue can have more cells, for example, 64 cells.

The second path comprises ten multiplexers 420a-j coupling the respective outputs of de-multiplexer 422 with the unicast and multicast queues 425a-j. Multiplexers 420a-j are used to select between unicast and multicast cells to be queued to each of the queues 425a-j. Further downstream the unicast and multicast queues 425a-j are coupled with a multiplexer 413. Multiplexer 413 couples one of the selected queues 425a-j with the input of a memory controller 414 when external memory is present. The input of multiplexer 412 is coupled with the output of memory controller 414. When the bridge is configured for no-external memory, multiplexer 413 couples one of the selected queues 425a-j directly to the input of a multiplexer 412. Multiplexer 412 provides ten output paths which connect to another set of ten queues 424a-j. Multiplexers 411a-e, each provides two more inputs. Thus, each multiplexer 411a-e couples with two of the queues 424a-j thereby coupling two queues with each interface 410a-e.

The bridge receives unicast cells from a single CSIX Rx interface 421. Unicast cells are queued to one of ten inbound queues 425a-j depending on its destination. A field in the UTOPIA 3 cell header indicates one of the ten egress ports, which is used to select the corresponding egress inbound queue. The bridge supports an external memory mode to provide greater egress buffering capacity. When no external memory 440 is present, cells are moved from one of the ten inbound queues 425a-j to one of the ten corresponding outbound queues 424a-j as entries become available. If external memory 440 is present, the cells will preferably be moved to the corresponding egress buffer in external memory 440. The cells will then be moved from external memory 440 to the outbound queues 424a-j as entries become available in the corresponding outbound queues 424a-j.

With ten outbound queues and five UTOPIA 3 Tx interfaces 410a-e, two outbound queues map to each Tx interface 410a-e. Each UTOPIA 3 Tx interface 410a-e has an arbitration control unit controlling multiplexers 411a-c that gives the highest priority to flow control cells and then arbitrates fairly between each of its two outbound queues 424a-j with unicast cells.

The bridge receives multicast cells from a single CSIX Rx interface 421. Upon receiving a multicast cell, the bridge uses the multicast label in the UTOPIA 3 cell header to perform a lookup in the multicast table (not shown in FIG. 3). The results of the table lookup indicate which of the ten ports should receive a copy of the multicast cell. The bridge will queue a copy of the multicast cell to the inbound queues 425a-j that correspond to the multicast cell's port destinations. Unicast and multicast cells share the same queuing structures and data paths.

External egress buffering is necessary because of the bandwidth difference between the switch fabric interface 421 and network processor TX interfaces 410*a-e*, the long Port-Level Flow Control latencies, and the requirement that Fibre Channel cells cannot be discarded. Performance simulations have shown that significant egress buffering is needed to minimize end-to-end cell latencies and to avoid head-of-line blocking. The egress buffer 440 is divided statically into ten buffers, one for each egress port, to eliminate head-of-line blocking. Each egress buffer is managed as an independent wrap-around FIFO. The memory controller will store the current head and tail for each egress buffer.

Figure 4:
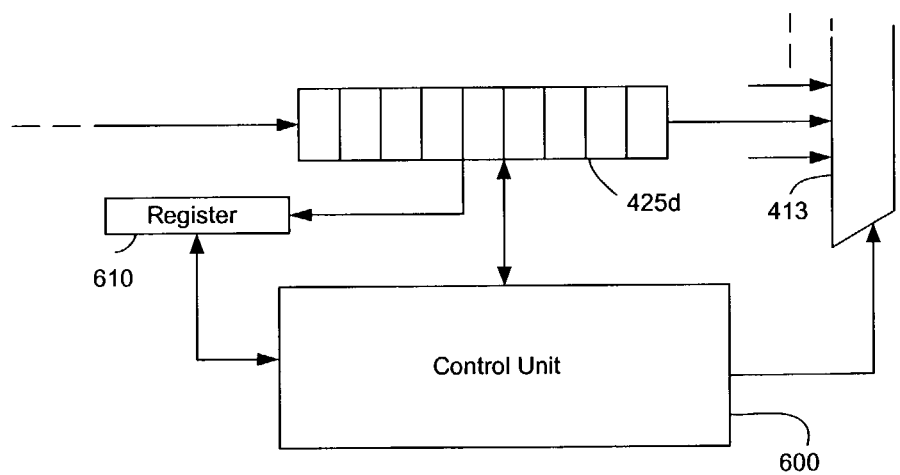
FIG. 4 is a schematic block diagram of a single queue and associated control circuitry.

FIG. 4 illustrates a block diagram with a partial view of multiplexer 413, and one of the queues and associated control circuitry used in the bridge system according to the exemplary embodiment of the present invention. As an example, only one egress queue, namely egress queue 425*d* is depicted in FIG. 4. The dotted lines in FIG. 4 indicate that more queues and respective registers may be coupled with the multiplexer 413. A control unit 600 coupled with queue 425*d* is provided to generate all necessary control and arbitration signals necessary to handle the data flow within the bridge 100. Control unit 600 is coupled with multiplexer 413 and generates control signals to select the egress data path by controlling the respective multiplexers. A watermark register 610 is coupled with queue 425*d* and with control unit 600. Watermark register 610 can store a value representing the filling level of queue 425*d* or can be a single bit indicating whether a predefined filling level has been reached, for example, by comparing an input and an output pointer. The sensitivity of the watermark registers can further be adjustable. All other queues can be implemented in a similar way. Register 610 may be either part of the queue or may be integrated within the control unit. Separate control units for the ingress and the egress paths may be provided or a single general control unit may control all functions of the queues and multiplexers. Furthermore, the queues, multiplexers, control units, and other necessary circuitry may be implemented within a single ASIC or around a microcontroller. The control unit further may be coupled with the host-subsystem interface. Thus, the host-subsystem may monitor the bridge activity, adjust the sensitivity of the watermark registers according to the data flow and perform other necessary administrative operations.

The bridge may be implemented to be able to support two egress buffering modes: 1) with external memory and 2) without external memory. The normal configuration will include external memory. External memory might be needed due to the egress buffering requirements. The external memory interface may be, for example but not limited to, a 128-bit wide quad data rate (QDR) SRAM interface operating at 100 MHz. This wide interface is needed to match the write bandwidth requirement of one CSIX switch fabric interface 421 and the read bandwidth requirement of five TX interfaces 410*a-e*. For example, such a memory interface can provide 4 MB of external memory. The bridge can support up to 8 MB of egress buffering. However, the memory size can be easily expanded by providing more address lines controlled by the bridge to take advantage of future QDR SRAM densities.

The following TABLE 1 lists preferred memory configurations.

TABLE 1

| Buffer Size (MB) | QDR SRAM Configuration | Bus width (bits) | Speed (MHz) | Bandwidth (Gbps) | Quantity |
|---|---|---|---|---|---|
| 4 | 9 Mb (512K × 18) | 128 | 100 DDR | 25.6 | 4 |
| 8 | 18 Mb (1M × 18) | | | | 4 |

The 80-byte (640-bit) CSIX cell preferably is stored in external memory. A 128-bit memory interface may be required to meet capacity and bandwidth requirements as well as maximize the efficiency of the memory interface.

Figure 5:
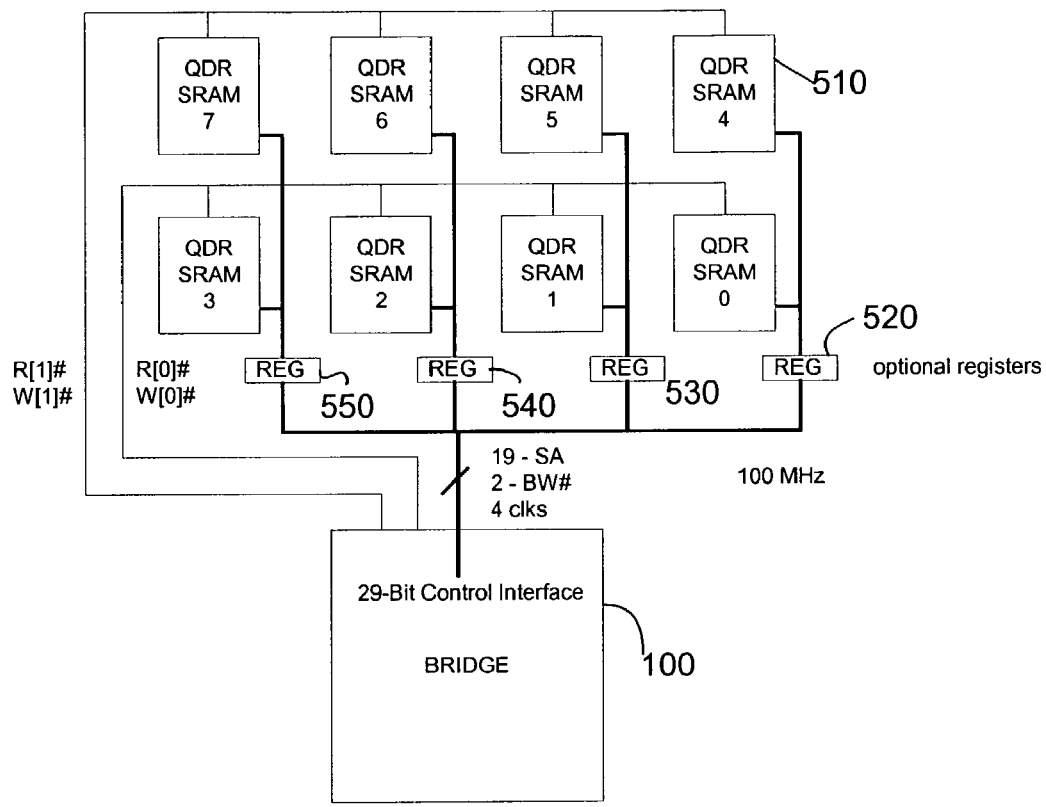
FIGS. 5 and 6 are schematic block diagrams of an exemplary embodiment of the egress memory interface.
Figure 6:
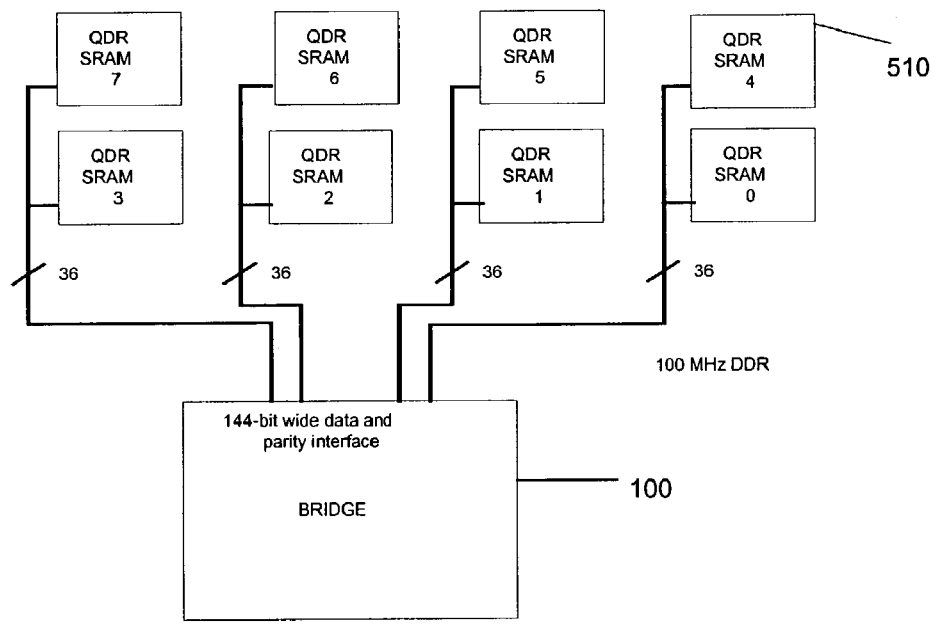

If the bridge is designed to be part of a robust system, the external memory interface can be equipped with error protection, such as parity or error correction code. Thus, to provide a highly reliable memory, for example, an error correcting code (ECC) memory can be used with the bridge according to the present invention. A first type of such a memory uses, for example but is not limited to, 1 check bit which is required to protect 8-bits of data. For a 128-bit memory interface, sixteen additional signals may be needed to provide memory protection for 128-bit of data resulting in a 144 bit wide data bus. FIG. 5 depicts a possible arrangement including four QDR SRAM modules and the coupling of, for example but is not limited to, 25 command, clock and address lines whereas FIG. 6 depicts the coupling of the 144 data lines for the same arrangement. The coupling of the command lines may include optional registers as illustrated in FIG. 5. These registers are used to latch data from DRAM devices. Typically, they are needed when the system operates at high-speed data rate.

Figure 7:
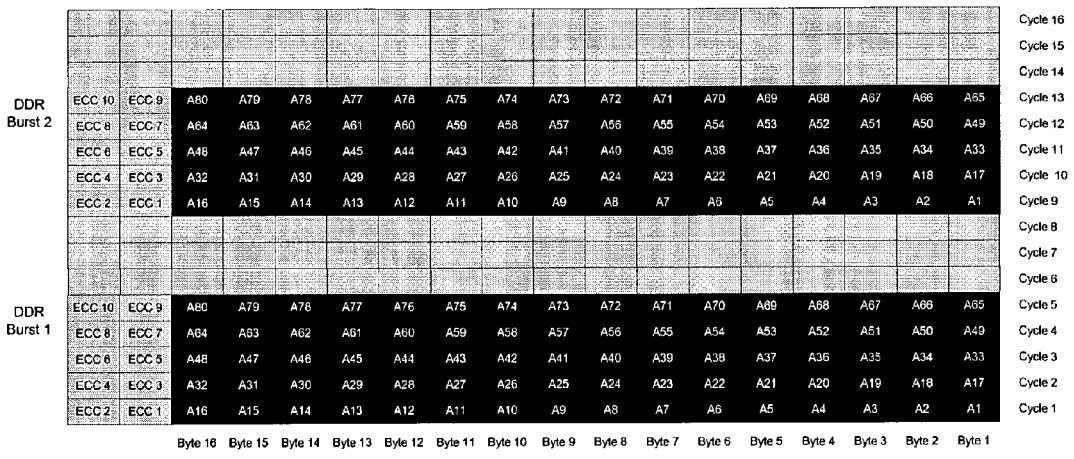

FIG. 7 shows typical writing sequences for such a memory. In this embodiment a 128 bit DDR SDRAM is used. Such a DDR SDRAM requires a burst length of 4 or 8 for maximum transmission speed. To be able to transfer one data cell, 80 bytes have to be stored. The data width of the memory interface of, for example dynamic memory like DDR SRAM, is bi-directional and provides 144 bits. Thus, the memory can store 16 bytes in parallel, five cycles are needed to store a complete cell leaving 3 rows, each having 16 bytes unused. This embodiment also provides additional memory space, namely 2 bytes per memory row, for storing the error correction code. Thus, additional pins and memory is required when implementing such a memory configuration. Other memory configurations and number of bytes to be transferred are contemplated herein and are within the scope of the invention.

Figure 8:
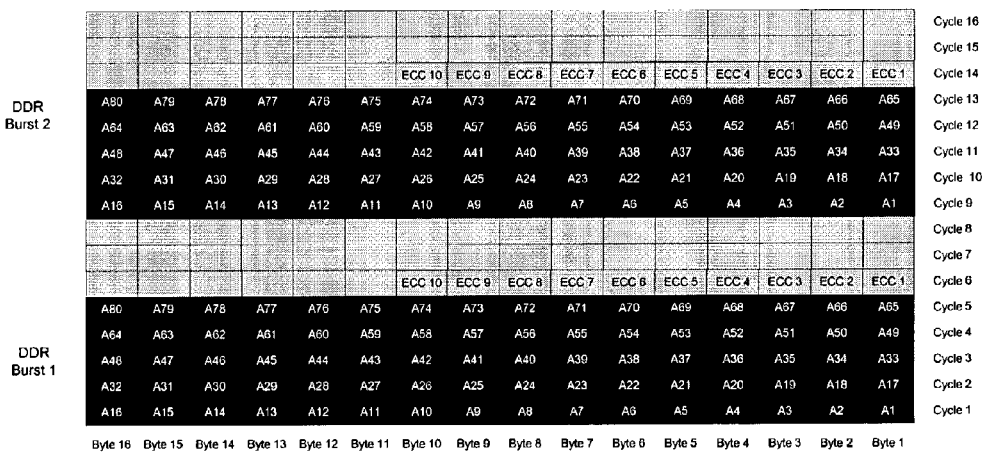

FIG. 8 shows a different example, using an in-band ECC memory scheme. With such a memory, the ECC bits are stored within normal memory space. Thus, the in-band ECC memory reduces the pin count and the number of memory devices that are needed. As shown in FIG. 7, the ECC code may be stored in the unused part of a memory transmission burst, namely in the 6th row of each burst transmission which usually contains no data.

Figure 9:

With static memory, such as QDR SRAM, the 128-bit memory interface will be separated into a 64-bit write memory interface and a 64-bit read memory interface. With a 64-bit read/write memory interface, ten data transfers are required per 640-bit cell. The QDR SRAM requires a burst length of 2. Such an embodiment is shown in FIG. 9 for a dedicated ECC QDR SRAM having additional memory for the error correction code and in FIG. 10 for an in-band ECC QDR SRAM. Quad data rate memories operate with 12 cycles per burst. Since ten cycles are needed to store a data cell, two memory rows will be left unused. The in-band ECC QDR SRAM takes advantages of these two memory rows by using 10 bytes for the error correction code and only leaving 6 bytes unused. Thus, a more economical usage of the external memory may be provided.

The bridge may experience congestion because of the bandwidth differences between the CSIX interface 107 and the network processor interfaces 101 through 105. Therefore, the bridge 100 provides circuitry to monitor the depth of all queues, such as, for example, its egress queues 425a-j, which correspond to one of the egress ports. If the depth of one of the egress queues 425a-j reaches a high watermark, the bridge 100 generates a special congestion indication message. The bridge sends the special congestion indication message to the network processor 101, 102, 103, 104, or 105 that corresponds to the congested egress queue 425a-j. The receiving network processor 101, 102, 103, 104, or 105 will then use its normal XOFF Port-Level Flow Control mechanism for the congested port. When the congested bridge egress buffer depth reaches a low watermark, the bridge will generate a special message indicating that the congestion has cleared. The receiving network processor will once again use its Port-Level Flow Control scheme to re-start traffic to the port.

The bridge will track the congestion status of each of the egress buffers. The congestion status will be used to ensure that only a single congestion indication message is generated each time a threshold is reached. Once an egress buffer is marked as congested, the bridge will not generate any more congestion indication messages until the low watermark has been reached and a resume message has been sent. If an egress buffer is marked as uncongested, the bridge will not generate a resume message each time the low watermark is reached.

The bridge 100 can comprise parity error register as mentioned above for each of the interfaces using a parity-control scheme. A parity register, thus, stores parity errors for all of the bridges interfaces. When a parity error occurs on one of the interfaces, the corresponding bit in the parity error register will be set. Each bit in the parity error register corresponds to one of the parity signals on the external interfaces. The parity error register is read and cleared with software through the host subsystem interface. Three configurable error output pins are provided to generate interrupts for errors. Upon receiving an interrupt, software can read status registers, such as the Parity Error Register, to learn about the error condition.

The bridge 100 permits some cells to be discarded. A special message type indicates whether or not a cell is discardable. The bridge 100 egress buffers have a programmable high watermark that indicates when to start discarding cells. If the depth of one of the egress buffers reaches the discard high watermark, all arriving cells destined to the congested egress buffer that are discardable are discarded. Cells are discarded until the egress buffer depth falls below a programmable low watermark.

Furthermore, other protocols such as ATM, SONET, InfiniBand may be used in addition to Ethernet and Fibre channel protocols. For example Quality of Service (QoS) protocols can be included as well. For example, the bridge may have multiple packets that are not discardable and are targeting the same egress port, the bridge then can use QoS or some other priority-based schemes to give preference to the packet that has the highest QoS or priority. Any other kind of priority based handling of data cells can be implemented. For example, highly prioritized data cells can be transported using the first egress path to avoid any kind of delay, thus circumventing the memory and additional queues.

Figure 11:
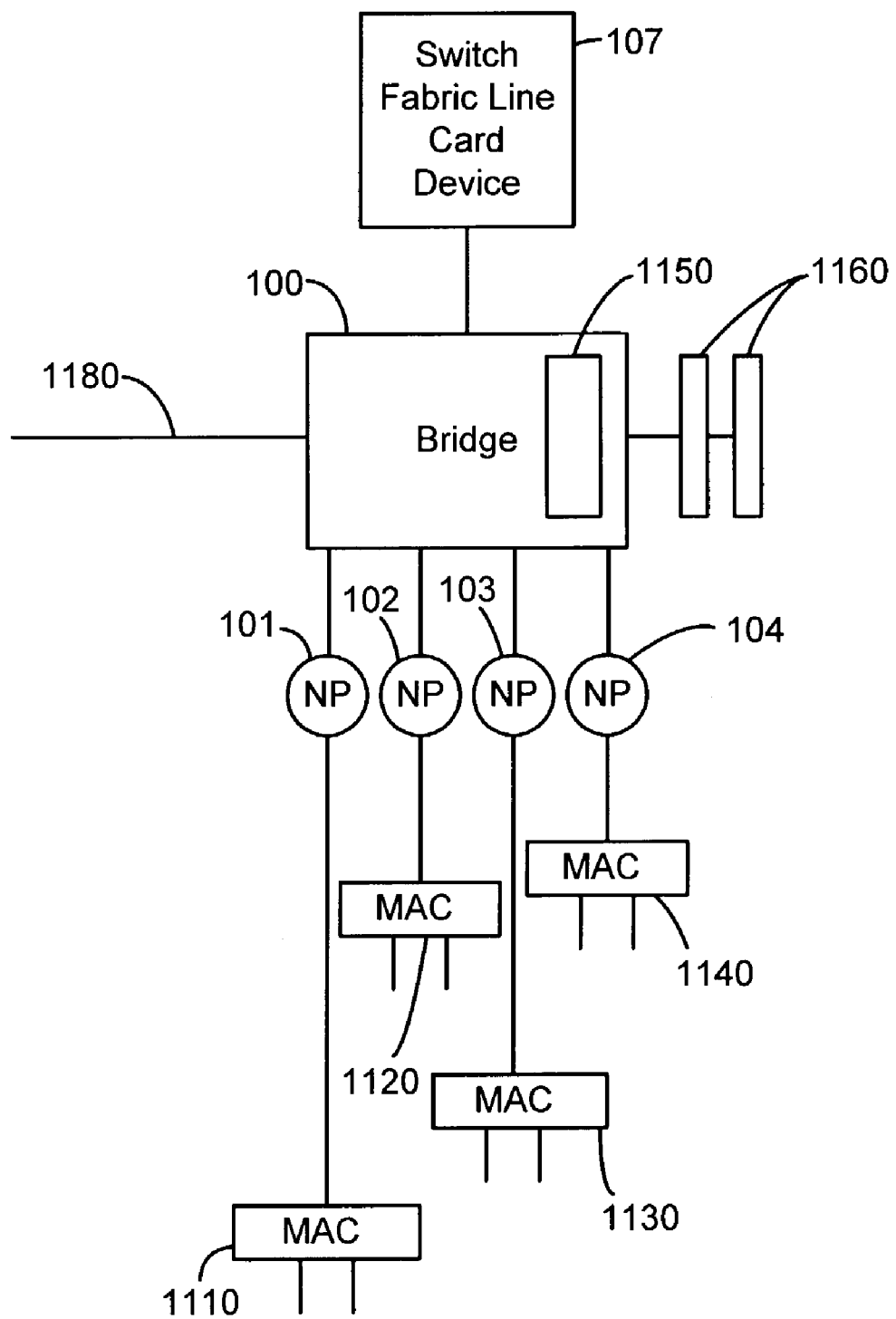
FIGS. 11 to 13 show block diagrams of additional exemplary embodiments of the present invention.

FIG. 11 shows yet another embodiment of the present invention providing enhanced protocol and data handling. Numerals used in previous figures are used for like elements in the present figure. Thus, a switch fabric card 107 is coupled with a bridge 100 as illustrated in FIG. 11. A plurality of four network processors 101, 102, 103, 104 are coupled with the bridge 100. Each network processor is coupled with a respective media access control device (MAC) 1110, 1120, 1130, and 1140. In this embodiment of the present invention, the bridge 100 comprises an additional accounting logic 1150 and associated memory 1160. The memory 1160 can be external as shown in FIG. 11, or the memory 1160 can be integrated within the bridge 100. The bridge 100 also has a microprocessor interface to send and/or receive signals from the microprocessor in the control plane processor (not shown) that configures and monitors the status of the data path's network processors.

Network processors provide some statistic-gathering functions for accounting purposes, but the utilization of the statistic-gathering features would require additional processing that could reduce line performance. If there are multiple network processors on a line card, then the control processor has additional overhead for the collection of statistics from multiple sources. Traffic managers also provide statistics that could be used for bill-back. However, in the SAN market, traffic managers provide more features than necessary, which would increases cost, power consumption, board real estate, etc.

The embodiment shown in FIG. 11 overcomes this problem mentioned above. The embodiment illustrated in FIG. 11 is particularly useful in applications where data centers are asking for bill-back capabilities, so that they can monitor and charge their customers accounts accordingly. This embodiment combines the protocol translation and bandwidth matching bridge functionality with flow-level statistical counters for bill-back. Statistics gathering in the bridge 100 offloads the network processors 101, 102, 103, 104 and provides a centralized collection point without the need for a costly traffic manager.

For protocol translation, the bridge 100 must look at various fields in the frame headers. Since the bridge 100 is already examining the header, as explained above with respect to FIGS. 3 and 4, the bridge 100 may also provide capabilities for collecting statistics. To that end, the control devices within the bridge 100 may also include the accounting logic 1150 and associated memory 1160. Moreover, the bridge 100 is equipped with a microprocessor interface 1180 for configuration and management that can be used by the control plane processor (that configures and monitors the status of the data path's network processors) in order to gather the collected statistics. As mentioned above, the bridge 100 may use internal and/or external memory 1160 for storing statistical information. The bridge 100 could also be equipped with special purpose accounting chips that are designed specifically to provide statistical information.

Bridges are often implemented in FPGAs, which provide a flexible re-programmable solution. The embodiment of FIG. 11 can take advantage of FPGA flexibility by re-programming the FPGA to support different consolidated statistic formats that can be recognized easily by accounting applications. Emerging FPGA technologies include embedded microprocessor cores. The embodiment of FIG. 11, therefore, may take advantage of these enhanced cores for further processing, formatting, applications, etc.

According to the embodiment of FIG. 11, the accounting logic 1150, which may be implemented through additional logic, reconfiguration of a microprocessor core, or any other suitable means, as described above, analyzes the data flow within the bridge 100, from and to the network processors 101, 1012, 103, 104, etc. The statistical data accumulated by the bridge 100 can then be stored in the additional memory 1160 and, for example, can later be requested by the Host subsystem 108 (see FIG. 1). Furthermore, the statistical data may include information that can be used for bill-back purposes. As mentioned previously, a bill-back function is often required by organizations that want to track network usage by gathering various statistics. The detailed statistics that are gathered may include device-level information, such as which devices are communicating, how much data is being moved between them, etc. Accounting applications can then use the statistical information so gathered to provide meaningful reports. Thus, the bill-back function enables a "user" to be billed for his or her network use. For example, the user may be billed based upon the number of connections that he made, the amount of data that he moved through the network, etc.

Figure 12:
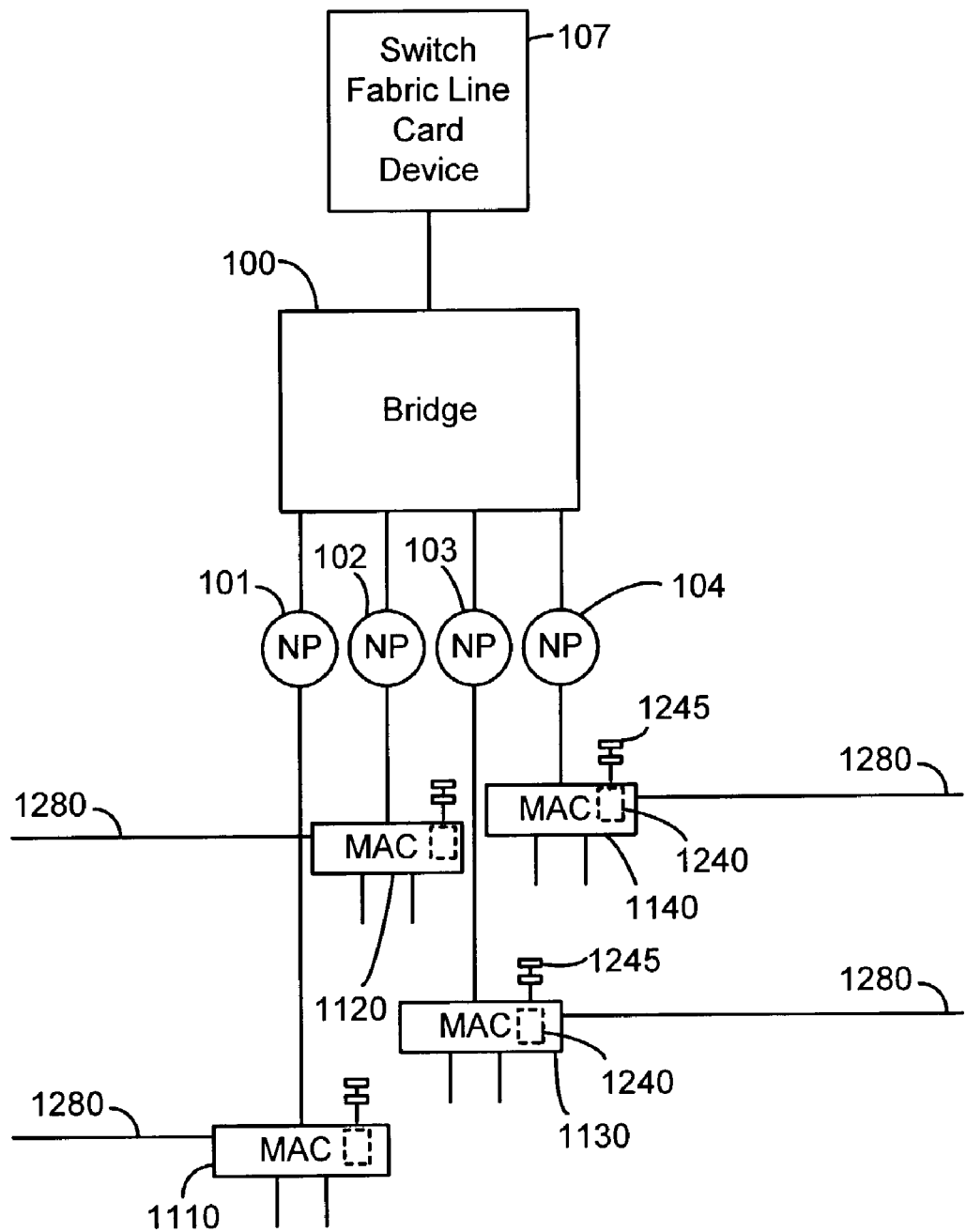

FIG. 12 shows yet another embodiment of such an advanced network interface system, again with like elements being represented by like numerals in the illustration. Unlike the embodiment of FIG. 11, where a centralized statistical gathering functionality was provided, the embodiment of FIG. 12 has each media access device incorporating its own associated accounting logic. So that FIG. 12 is less cluttered, numerals are only shown for MAC 1140, however it is intended that the other MAC's are similarly equipped as MAC 1140. Thus, each MAC comprises an accounting logic 1240 and associated memory 1245. The logic 1240 may be implemented within the already existing logic of the MAC 1110, 1120, 1130, and 1140. Again, the memory 1245 can be internal or external of each MAC 1110, 1120, 1130, and 1140. Unlike the embodiment of FIG. 11, this embodiment has the microprocessor interfaces to the control plane processor (that configures and monitors the status of the data path's network processors) to the MAC 1110, 1120, 1130, and 1140 as illustrated in FIG. 12.

Figure 13:
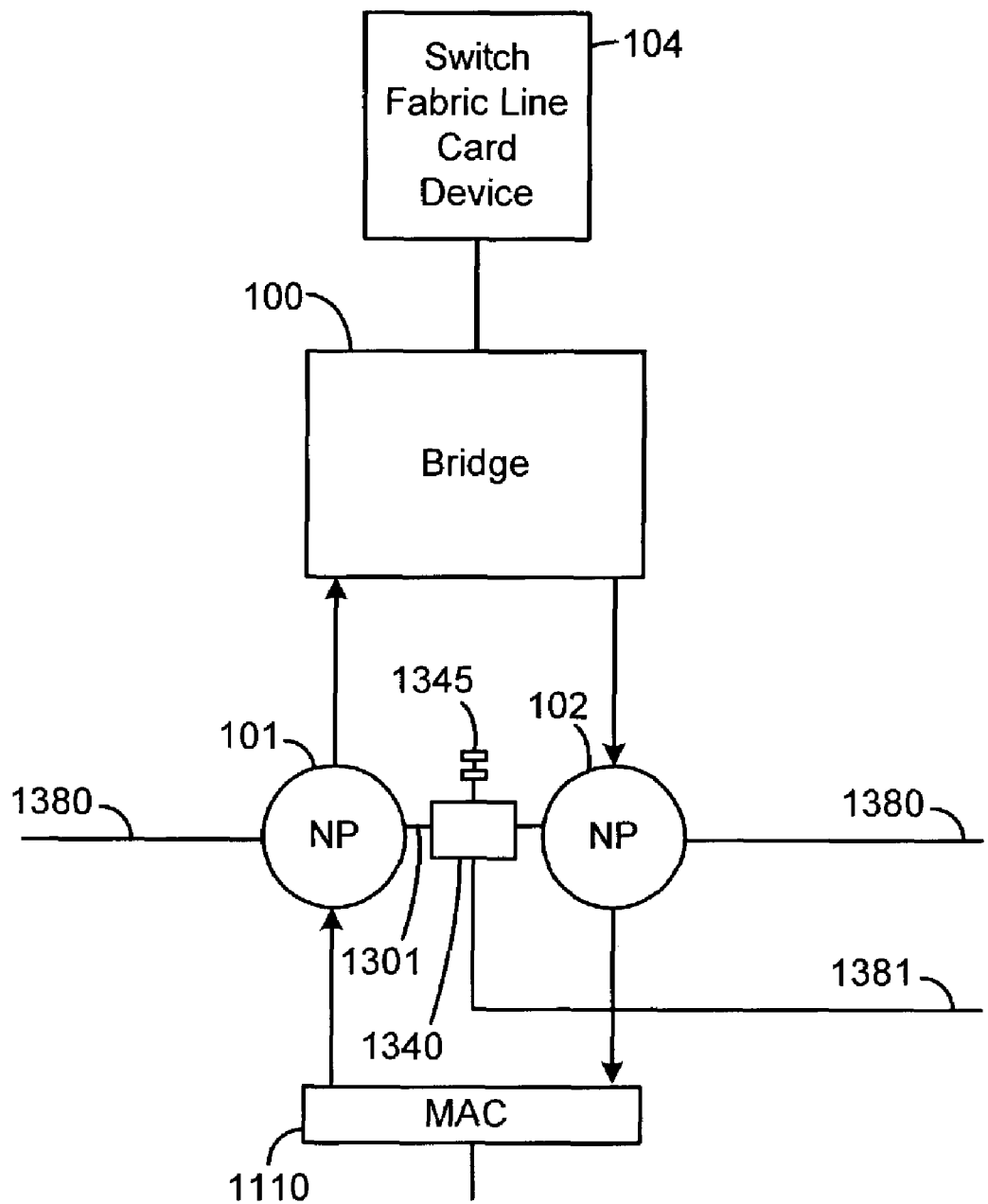

FIG. 13 shows another embodiment of the present invention where the statistical gathering function is implemented in a co-processor that is shared between two network processors, such as 10 Gbps simplex processors 101 and 102. The ingress network processor 101 would use the co-processor 1340 to offload ingress statistics, whereas the egress network processor 102 would use the co-processor 1340 to offload egress statistics. The network processors 101 and 102 determine which statistics to collect, but the co-processor 1340 offloads (stores) the statistics, either in its internal or external memory 1345, or to another device. The co-processor 1340 enables the network processors 101 and 102 to update multiple statistics at once and hides read-modify-write performance issues. The co-processor 1340 could be located, for example, on a dedicated co-processor interface 1301 of the network processor 101, or the co-processor 1340 may simply be a memory-mapped device sitting on a SRAM or DRAM network processor interface (not shown). The control plane processor could access the statistics through the microprocessor interface 1380 of either network processor 101 or 102, or through a dedicated microprocessor on the interface 1381. This multi-port co-processor embodiment could also be used with multiple full-duplex network processors 101 and/or 102.

Additional alternate embodiments can be formed by mixing and matching configurations illustrated in FIGS. 11, 12 and 13. For example, some of the network processors 101 can be operative with an accounting logic co-processor 1340, while the MAC 1140 is operative with the accounting logic 1240, while the bridge 100 can have its own accounting logic 1150 to handle the accounting for network processors 102 and 103 and/or MCA 1120 and 1130, and so on.

The invention is not limited to four or five network processor interfaces. A bridge 100 according to the present invention can comprise any number of network interfaces. Furthermore, additional interfaces having other protocols can be easily adapted and thus implemented within the bridge system according to the present invention.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A network system comprising:
    a plurality of network processor interfaces for transmitting and receiving data cell sequences,
    a switch fabric interface;
    an ingress path providing a plurality of ingress queues between the plurality of network processor interfaces and the switch fabric interface combining the transmitted data cells of the network processors to a single data cell sequence;
    an egress path providing a plurality of egress queues and a memory controller between the plurality of the switch fabric interface and network processor interfaces for distributing data cell sequences from a received data cell sequence to the respective network processor interfaces, the egress path comprising a first egress path handling control signals and a second egress path handling data signals; and
    logic for providing statistical information for the data transfer within the network system.

2. The system according to claim 1, wherein the logic is implemented by a microprocessor used for control purposes.

3. The system according to claim 1, further comprising a control unit for controlling the ingress path and the egress path and wherein the control unit is configured to provide the statistical data.

4. The system according to claim 3, wherein the ingress queues each have an input and an output, each ingress queue input being coupled with a respective transmitting network processor interface, and the ingress path further comprises a multiplexer coupled with the outputs of the plurality of ingress queues and the switch fabric interface.

5. The system according to claim 4, further comprising an ingress output queue coupled between the multiplexer and the switch fabric interface.

6. The system according to claim 1, wherein the egress path comprises a de-multiplexer coupled with the switch fabric interface and the plurality of egress queues.

7. The system according to claim 1, wherein said memory controller comprises a memory interface and a egress path routing switch routing the received cells through a memory coupled with the memory controller or directly to the network processor interfaces if no memory is coupled with the memory controller.

8. The system according to claim 7, further comprising a first set of egress queues coupled between the de-multiplexer and a memory multiplexer coupled with a memory controller input, a memory de-multiplexer coupled with a memory controller output, a second set of egress queues coupled between the memory de-multiplexer and the network processor interfaces.

9. The system according to claim 8, wherein the first egress path comprises a third set of egress queues coupled between the de-multiplexer and the network processors and the second egress path comprises the first and second egress queues, and wherein a plurality of output multiplexers is coupled between the network processors and the first and second egress paths.

10. The system according to claim 1, further comprising a memory associated with logic for providing statistical data.

11. The system according to claim 7, wherein the memory interface is configured to couple with an error correcting memory.

12. The system according to claim 7, wherein the memory interface is configured to couple with a dynamic memory.

13. The system according to claim 11, wherein the memory interface is configured to couple with a static memory.

14. The system according to claim 11, wherein the error correcting memory is an in-band memory.

15. The system according to claim 1, wherein each queue comprises an associated watermark register.

16. The system according to claim 15, further comprising a control unit for controlling the ingress and egress queues and for providing the statistical data.

17. The system according to claim 15, further comprising a host-subsystem interface coupled with the control unit.

18. The system according to claim 1, wherein the network processor interface is provided on a line card having five network processor ports.

19. The system according to claim 18, wherein the line card has more than five network processor ports.

20. The system according to claim 19, wherein the switch fabric interface has a higher bandwidth than one of the plurality of network processor interfaces and the number of network processors interfaces is adapted to approximately match the bandwidth of the bandwidth of the switch fabric interface.

21. The system according to claim 1, wherein the logic is implemented by a bridge.

22. The system according to claim 21, wherein the logic is accounting logic.

23. The system according to claim 21, wherein the bridge further comprises memory.

24. The system according to claim 23, wherein said memory is internal to the bridge.

25. The system according to claim 23, wherein said memory is external to the bridge.

26. The system according to claim 21, wherein one or more network processors are coupled to the bridge.

27. The system according to claim 26, wherein each of the one or more network processors are further coupled to a media access control device.

28. The system according to claim 27, wherein at least one of the media access control devices has an accounting logic.

29. The system according to claim 28, wherein at least one of the media access control devices has a memory associated with the accounting logic.

30. The system according to claim 29, wherein the memory associated with the accounting logic is internal to the media access control device.

31. The system according to claim 29, wherein the memory associated with the accounting logic is external to the media access control device.

32. The system according to claim 21, wherein the system gathers statistical information.

33. The system according to claim 32, wherein the statistical information is used for bill-back purposes.

34. The system according to claim 32, wherein the statistical information is used to track user activity.

35. The system according to claim 28, wherein the system gathers statistical information.

36. The system according to claim 35, wherein the statistical information is used for bill-back purposes.

37. The system according to claim 35, wherein the statistical information is used to track user activity.

38. A method of controlling the ingress and egress data paths of a network processor interface system, said method comprising the steps of:
   providing a plurality of network processor interfaces for transmitting and receiving data cell sequences,
   providing a switch fabric interface;
   providing an ingress path having a plurality of ingress queues between the plurality of network processor interfaces and the switch fabric interface combining the transmitted data cells of the network processors to a single data cell sequence;
   providing an egress path having a plurality of egress queues and a memory controller between the plurality of the switch fabric interface and network processor interfaces for distributing data cell sequences from a received data cell sequence to the respective network processor interfaces;
   splitting the egress path into a first path handling control data cells and a second path handling data cells; and
   collecting and storing statistical information during a data transfer.

39. The method according to claim 38, further comprising the steps of:
   buffering transmitted data cells in the ingress queues,
   combining the content of the ingress queues,
   buffering the combined data cells in an ingress output queue, and
   analyzing the data cells for generating statistical data.

40. The method according to claim 38, further comprising the step of:
   if a memory is coupled to the memory interface, storing received data cells in the memory,
   otherwise moving the received data cells directly to the respective network processor interface.

41. The method according to claim 38, further comprising the steps of:
   providing at least two egress queues for each network processor interface, and
   selecting which queue is coupled with the associated network processor interface.

42. The method according to claim 40, further comprising the steps of:
   generating a control data cell by the memory controller, and
   routing the generated control cell through the first egress path.

43. The method according to claim 38, further comprising the steps of:
- monitoring the filling level of the queues, thereby collecting the statistical data; and
- generating control signals according to the filling level.

44. The method according to claim 43, further comprising the step of:
- discarding data cells according to their status if the filling level is reached within a queue.

45. The method according to claim 38, further comprising the step of:
- distributing data cells according to a priority scheme included in the data cells, thereby collecting the statistical data.

46. The method according to claim 38, further comprising:
- distributing data cells according to a Quality of Service scheme included in the data cells, thereby collecting the statistical data.

47. The method according to claim 38, wherein storage area network and networking protocols are processed.

48. The method according to claim 38, wherein the switch fabric interface has a higher bandwidth than one of the plurality of network processor interfaces, and the method further comprises the step of providing a number of network processor interfaces adapted for combining the bandwidth of the network processors to approximately match the bandwidth of the switch fabric interface.

49. The method according to claim 48, wherein the bandwidth of the switch fabric interface is lower than the combined bandwidth of the network processor interfaces.

50. A network system comprising:
- a plurality of network processor interfaces for transmitting and receiving data cell sequences;
- a plurality of media access control units associated to each network processor, wherein each media access control unit comprises an accounting logic for collecting statistical data of the transmitted and received data cell sequences;
- a switch fabric interface;
- an ingress path providing a plurality of ingress queues between the plurality of network processor interfaces and the switch fabric interface combining the transmitted data cells of the network processors to a single data cell sequence; and
- an egress path providing a plurality of egress queues and a memory controller between the plurality of the switch fabric interface and network processor interfaces for distributing data cell sequences from a received data cell sequence to the respective network processor interfaces, the egress path comprising a first egress path handling control signals and a second egress path handling data signals.

51. The system according to claim 50, wherein each media access control unit further comprises an associated memory for storage of the statistical data.

52. A network system comprising:
- a bridge;
- a plurality of network processor interfaces operative with the bridge for transmitting and receiving data cell sequences;
- at least one media access control unit associated with the network processors;
- a switch fabric interface operative with the bridge;
- an ingress path providing a plurality of ingress queues between at least one of the network processor interfaces and the switch fabric interface combining the transmitted data cells of the network processors to a single data cell sequence;
- an egress path providing a plurality of egress queues and a memory controller between the plurality of the switch fabric interface and at least one network processor interfaces for distributing data cell sequences from a received data cell sequence to the respective network processor interfaces, the egress path comprising a first egress path handling control signals and a second egress path handling data signals; and
- accounting logic operative with the network processors for collecting statistical data of the transmitted and received data cell sequences.

53. The system according to claim 52, wherein the accounting logic has an associated memory for storage of the statistical data.

* * * * *